(12) United States Patent
Sonoda et al.

(10) Patent No.: US 10,990,074 B2
(45) Date of Patent: Apr. 27, 2021

(54) CONTROLLER FOR MACHINE TOOL

(71) Applicant: FANUC CORPORATION, Yamanashi (JP)

(72) Inventors: Naoto Sonoda, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 5 days.

(21) Appl. No.: 16/372,857

(22) Filed: Apr. 2, 2019

(65) Prior Publication Data

US 2019/0310603 A1 Oct. 10, 2019

(30) Foreign Application Priority Data

Apr. 6, 2018 (JP) .............. JP2018-073720

(51) Int. Cl.
*G05B 19/19* (2006.01)

(52) U.S. Cl.
CPC .... *G05B 19/19* (2013.01); *G05B 2219/45044* (2013.01)

(58) Field of Classification Search
CPC .............. G05B 19/19; G05B 19/416; G05B 19/45044; B23Q 17/10
See application file for complete search history.

(56) References Cited

U.S. PATENT DOCUMENTS

| 6,637,986 B2 * | 10/2003 | Powell ................. | G05B 19/182 |
| | | | 408/1 R |
| 2004/0207356 A1 * | 10/2004 | Endo ...................... | G05B 19/19 |
| | | | 318/574 |

(Continued)

FOREIGN PATENT DOCUMENTS

| CN | 106607713 A | 5/2017 |
| JP | S48-031595 B1 | 9/1973 |

(Continued)

OTHER PUBLICATIONS

English translation of JP S56-163860 (Year: 1981).*

(Continued)

*Primary Examiner* — Alan Snyder
(74) *Attorney, Agent, or Firm* — Studebaker & Brackett PC (57) ABSTRACT

To provide a controller for a machine tool capable of shredding chips without use of oscillation during machining by cutting. A controller is for a machine tool used for machining by cutting of a work as a cutting target by means of coordinated motion of multiple axes including at least a spindle axis. The controller comprises: a movement command generation unit that outputs a movement command for cutting the work by moving a cutting tool and the work relative to each other in a machining direction; and a stop determination unit that outputs a stop instruction for intermittently stopping the relative move in the machining direction to the movement command generation unit. The movement command generation unit outputs a movement command for stopping the relative move between the cutting tool and the work in the machining direction based on the stop instruction. The stop determination unit outputs the stop instruction for a period when the spindle axis rotates 360 degrees or more.

9 Claims, 4 Drawing Sheets

(56) References Cited

U.S. PATENT DOCUMENTS

| | | | |
|---|---|---|---|
| 2005/0162111 A1* | 7/2005 | Tsutsui | G05B 19/19 318/434 |
| 2008/0054829 A1* | 3/2008 | Onishi | G05B 19/19 318/255 |
| 2010/0135740 A1 | 6/2010 | Harif | |
| 2014/0113525 A1* | 4/2014 | Chan | B25J 9/1679 451/5 |
| 2016/0091886 A1* | 3/2016 | Sato | G05B 19/416 700/188 |
| 2018/0026565 A1* | 1/2018 | Nakaminami | B23Q 17/007 318/490 |
| 2018/0364681 A1* | 12/2018 | Fujiyama | G05B 19/41 |

FOREIGN PATENT DOCUMENTS

| | | |
|---|---|---|
| JP | S56-163860 A | 12/1981 |
| JP | H02-180540 A | 7/1990 |
| JP | 5033929 B1 | 9/2012 |
| WO | 2014/125569 A1 | 8/2014 |

OTHER PUBLICATIONS

An Office Action mailed by the Japanese Patent Office dated Mar. 31, 2020, which corresponds to Japanese Patent Application No. 2018-073720 and is related to U.S. Appl. No. 16/372,857; with English language translation.

An Office Action mailed by the China National Intellectual Property Administration dated Nov. 27, 2020, which corresponds to Chinese Patent Application No. 201910258167.0 and is related to U.S. Appl. No. 16/372,857; with partial English language translation.

An Office Action mailed by the German Patent Office dated Dec. 3, 2020, which corresponds to German Patent Application No. 10 2019 204 647.9 and is related to U.S. Appl. No. 16/372,857; with partial English language translation.

\* cited by examiner

CONTROLLER FOR MACHINE TOOL

This application is based on and claims the benefit of priority from Japanese Patent Application No. 2018-073720, filed on 6 Apr. 2018, the content of which is incorporated herein by reference.

BACKGROUND OF THE INVENTION

Field of the Invention

The present invention relates to a controller for a machine tool used for machining by cutting of a work by means of coordinated motion of multiple axes.

Related Art

There has been a machine tool conventionally known used for machining by cutting of a work as a machining target by means of coordinated motion of multiple axes. In such a machine tool, to shred chips caused by cutting, oscillating cutting has been employed in some cases by which machining by cutting proceeds while a cutting tool and a work are caused to oscillate relative to each other in a machining direction.

Figure 4A:
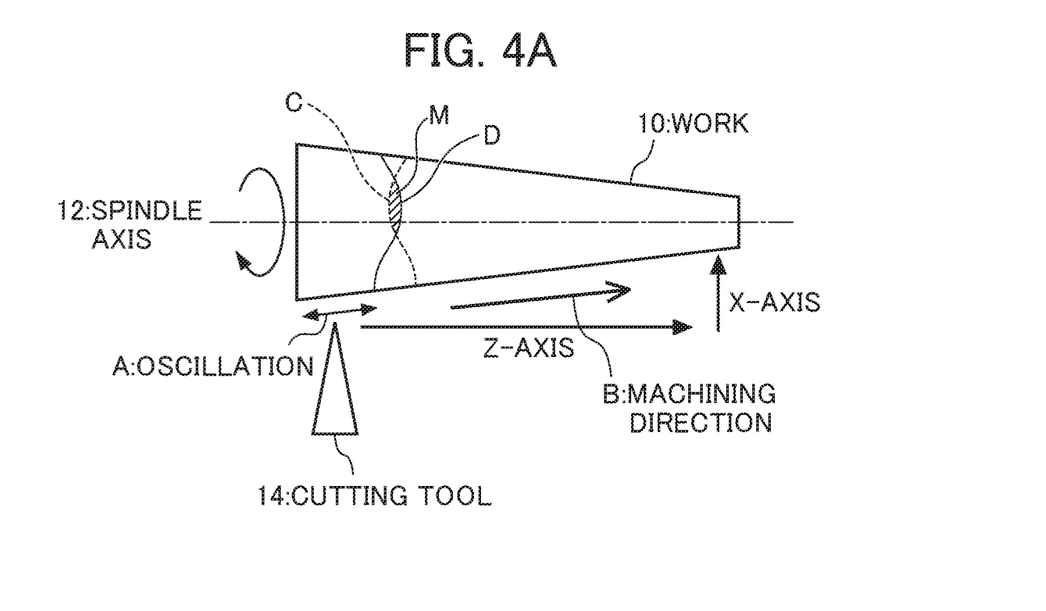
FIG. 4A shows conventional oscillating motion.
Figure 4B:
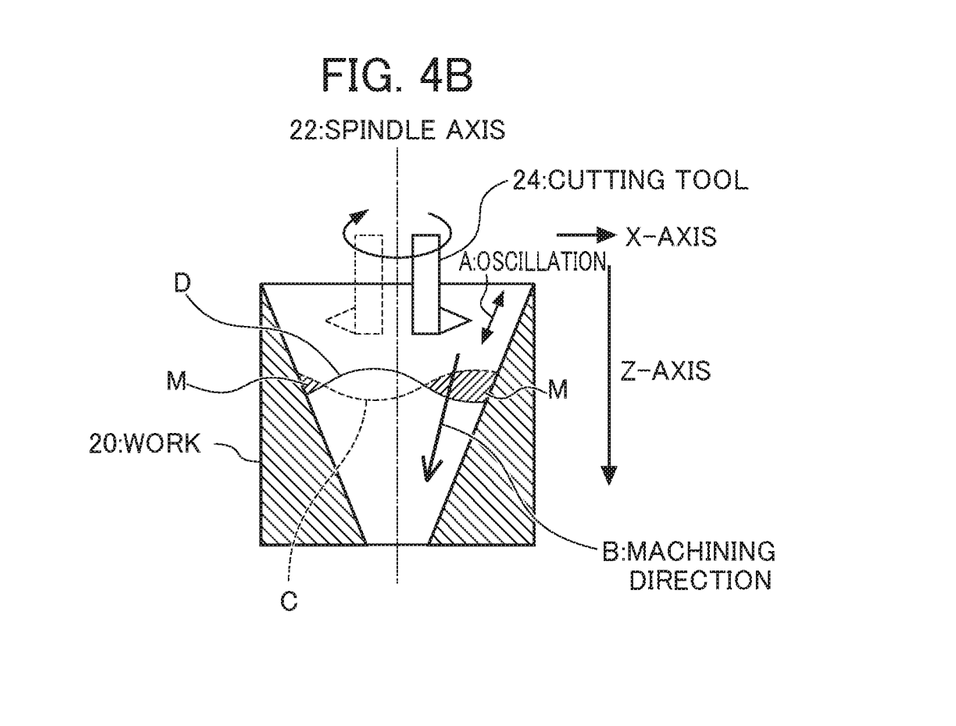
FIG. 4B shows conventional oscillating motion.

Conventional oscillating cutting will be described in detail below by referring to FIGS. 4A and 4B. FIGS. 4A and 4B each show conventional oscillating motion. FIG. 4A shows how a surface of a work 10 is subjected to machining by cutting with a cutting tool 14 while the work 10 is rotated about a spindle axis 12 as a rotary axis. As shown in FIG. 4A, the cutting tool 14 is used for cutting the surface of the work 10 based on a predetermined program. This machining proceeds along a Z-axis (in the same direction as the spindle axis) or in a machining direction B (a direction in which the machining proceeds) at a predetermined angle from the Z-axis, for example.

During the foregoing machining by cutting, oscillation A is applied to the cutting tool 14 in the machining direction B. The oscillation A causes what is called vibration of the cutting tool 14 in the machining direction. The cutting tool 14 is to be placed in a contacting state and a non-contacting state with the work 10 repeatedly. Hence, if machining along a path D is performed, then the spindle axis is rotated one turn, and then machining along a path C is performed, move in the air M is generated at a position where the path C is located behind the path D in the machining direction, as shown in FIG. 4A. As a result of this move in the air M, chips are shredded.

FIG. 4B shows how a work 20 with an internal cavity is subjected to machining by cutting inside the cavity with a cutting tool 24. As shown in FIG. 4B, the cutting tool 24 rotates relative to the work 20 and the axis of the cutting tool 24 functions as a spindle axis. Specifically, the spindle axis 12 of FIG. 4A means an axis about which the work 10 rotates, and a spindle axis 22 of FIG. 4B means an axis about which the cutting tool 24 rotates. In this way, the "spindle axis" mentioned in this patent may correspond to the rotary axis of a cutting tool and the rotary axis of a work.

In FIG. 4B, the cutting tool 24 is used for cutting the surface of the interior of the cavity in the work 10 based on a predetermined program. Like in the case of FIG. 4A, this machining proceeds in the machining direction B. In FIG. 4B, the oscillation A is also applied to the cutting tool 24 in the machining direction B. The cutting tool 24 is to be placed in a contacting state and a non-contacting state with the work 20 repeatedly. Hence, if machining along the path D is performed, then the spindle axis is rotated one turn, and then machining along the path C is performed, the move in the air M is generated at a position where the path C is located behind the path D in the machining direction as shown in FIG. 4B. As a result of this move in the air M, chips are shredded.

There has been an exemplary technique disclosed in relation to the foregoing oscillating cutting. This technique is to perform machining by cutting by causing a cutting tool to vibrate at a low frequency (see patent document 1, for example). This technique is expected to make it unlikely that chips will become attached to the cutting tool by realizing low-frequency vibration cutting of causing the cutting tool to oscillate with maximum vibration and shredding the chips into powder form.

There has also been a disclosed technique of shredding chips by causing low-frequency vibration in a 2-axis direction (see patent document 2, for example). This technique is expected to allow calculation of a cutting condition without the need of storing the cutting condition in a table.

Patent Document 1: Japanese Patent No. 5033929
Patent Document 2: PCT International Publication No. WO2014/125569

SUMMARY OF THE INVENTION

In the conventional oscillating cutting, changing an oscillation frequency or an oscillation amplitude is preferable in response to a change in a machining condition. However, exerting control for such changes is complicated. In particular, if each control parameter is stored in advance in a table like in the technique of patent document 1, it becomes difficult to adjust an oscillation parameter in response to a condition for machining on a work. Further, in the absence of the use of a table like in the technique of patent document 2, an excessive amount of resultant calculation becomes necessary.

Exerting control of moving a cutting tool or a work forward or backward like in the conventional oscillating cutting results in application of overload on the cutting tool in a manner that depends on an acceleration/deceleration speed to be generated. This causes the problem of shortened life of the cutting tool.

Hence, development of a technique capable of shredding chips without use of oscillation during machining by cutting has been desired.

The present invention has been made in view of the foregoing problem and is intended to provide a controller for a machine tool capable of shredding chips without the use of oscillation during machining by cutting.

(1) The present invention provides a controller (controller 100 described later, for example) for a machine tool used for machining by cutting of a work as a cutting target by means of coordinated motion of multiple axes including at least a spindle axis, comprising: a movement command generation unit (movement command generation unit 104 described later, for example) that outputs a movement command for cutting the work by moving a cutting tool and the work relative to each other in a machining direction; and a stop determination unit (stop determination unit 102 described later, for example) that outputs a stop instruction for intermittently stopping the relative move in the machining direction to the movement command generation unit, wherein the movement command generation unit outputs a movement command (speed command described later, for example) for stopping the relative move between the cutting tool and the work in the machining direction based on the stop instruction, and the stop determination unit outputs the stop instruction for a period when the spindle axis rotates 360 degrees or more.

(2) In the controller for the machine tool described in (1), the stop determination unit may output the stop instruction in synchronization with the rotation angle of the spindle axis.

(3) In the controller for the machine tool described in (1), the stop determination unit may output the stop instruction at every predetermined temporal cycle.

(4) In the controller for the machine tool described in any one of (1) to (3), the stop determination unit may output the stop instruction in response to an external signal as a trigger.

The present invention can provide a controller for a machine tool capable of shredding chips without use of oscillation during machining by cutting.

DETAILED DESCRIPTION OF THE INVENTION

An embodiment of the present invention will be described below based on the drawings.

Figure 1:
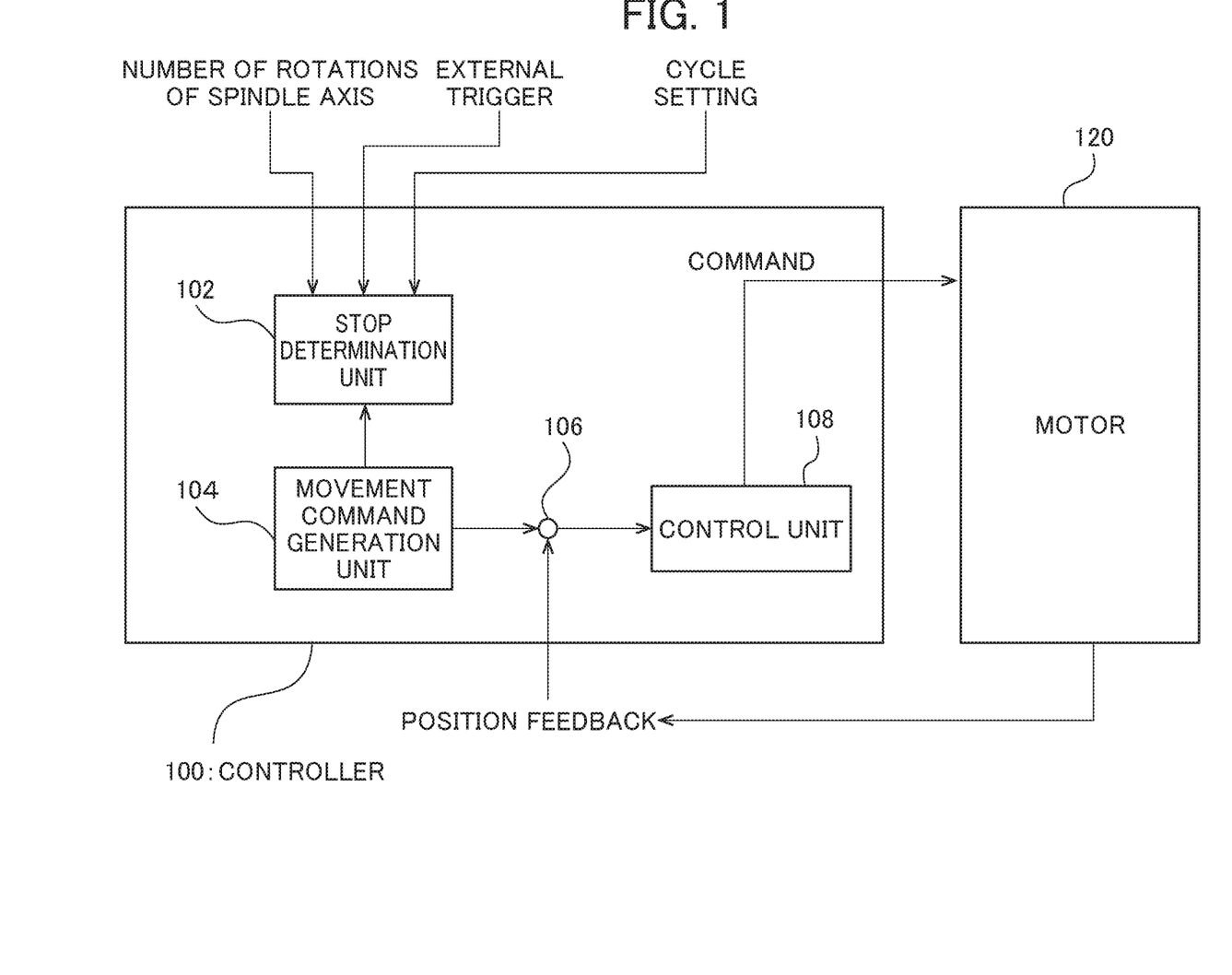
FIG. 1 is a functional block diagram showing the configuration of a controller for a machine tool according to an embodiment of the present invention.

FIG. 1 is a functional block diagram showing the configuration of a controller 100 for a machine tool according to the embodiment. The machine tool according to the embodiment is a tool to machine a work as a target of machining by cutting by rotating the work and moving a cutting tool in a machining direction relative to the work. The spindle axis of the machine tool is an axis about which the work rotates. The machining by cutting of the embodiment will be described in detail later.

As shown in FIG. 1, the controller 100 controls a motor 120 for driving a cutting tool of the machine tool. The controller 100 includes a movement command generation unit 104 that moves the cutting tool of the machine tool, a stop determination unit 102 that makes a determination about stop, an adder 106, and a control unit 108. These units may be configured using programs describing the respective functions and processes by these units and a CPU to execute these programs, for example. The controller 100 may be configured as a computer. A CPU in this computer may execute the programs describing the respective functions and processes by these units to realize the controller 100.

The movement command generation unit 104 generates a command for moving the cutting tool in order to perform machining on the work. The movement command generation unit 104 generates a movement command by following a predetermined program.

The adder 106 subtracts a position feedback from the movement command generated by the movement command generation unit 104 to determine a difference between these signals and outputs a positional deviation resulting from the calculation to the control unit 108. The position feedback may be a position detected by a rotary encoder attached to an axis of the motor 120 for driving the cutting tool of the machine tool, for example, and the detected position may be used as a position feedback value.

The control unit 108 generates a command for driving the motor 120 in response to the input positional deviation and outputs the generated command to the motor 120. In response to this command, the motor 120 for the cutting tool is driven to move the cutting tool relative to the work.

The stop determination unit 102 outputs a stop instruction for stopping the movement command generated by the movement command generation unit 104 to the movement command generation unit 104 with predetermined timing. Based on this stop instruction, the movement command generation unit 104 outputs a movement command indicating stop. Any movement command is applicable, as long as this command indicates stop. For example, movement commands indicating the same position may be output continuously to realize "stop."

Figure 2:
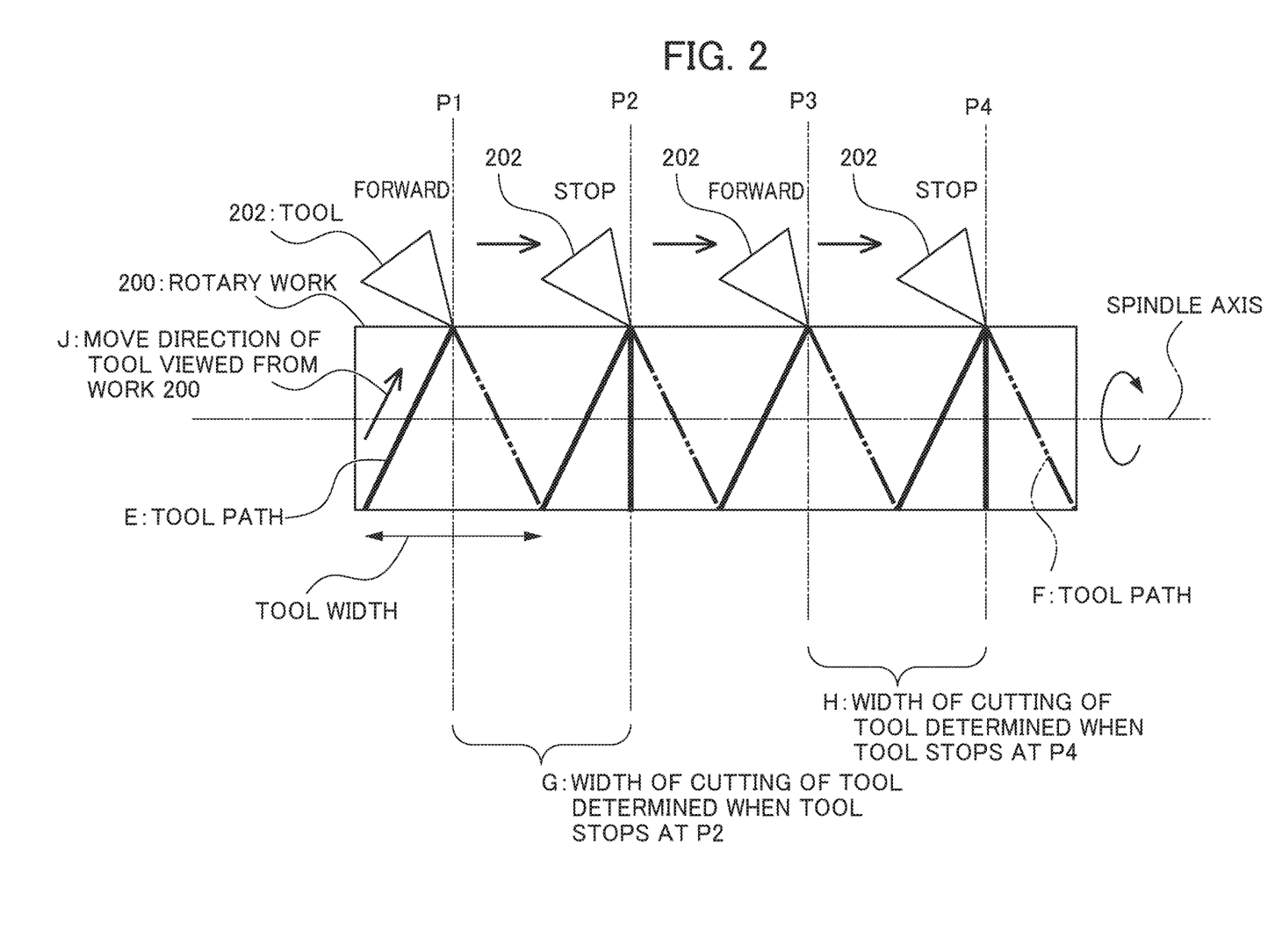
FIG. 2 schematically shows how machining by cutting proceeds using the controller for the machine tool according to the embodiment of the present invention.

FIG. 2 schematically shows how machining by cutting proceeds using the controller 100 for the machine tool according to the embodiment. As shown in FIG. 2, a rotary work 200 to rotate (hereinafter called a work 200) is rotated by the spindle axis. A cutting tool 202 (hereinafter called a tool 202) moves in a machining direction parallel to the spindle axis for machining by cutting of a surface of the work 200.

In FIG. 2, a blade of the tool 202 is schematically shown by triangles. The tool width of the tool 202 corresponds to a gap between adjacent bold lines in FIG. 2. The tool 202 moves in the machining direction from a position P1, passes through a position P2 and a position P3, and reaches a position P4. As described above, the tool 202 moves along a tool path shown in FIG. 2 in response to a speed command output from the controller 100.

While the work 200 rotates in response to the rotation of the spindle axis, the surface of the work 200 is subjected to machining by cutting with the tool 202. Thus, the tool 202 moves along a tool path E indicated by bold lines in FIG. 2. The tool path E also includes a path existing on the back side of the plane of the sheet, and this path is indicated by dashed lines (this path is called a tool path F).

In FIG. 2, an arrow J is drawn along the tool path E. The arrow J shows a move direction of the tool 202 as viewed from the work 200. The tool 202 is to move on the surface of the rotating work 200 in the machining direction from the position P1 toward the position P4. Thus, the tool 202 is to move along a substantially spiral path, as shown in FIG. 2. The tool 202 of the embodiment does not make oscillating motion. More specifically, the controller 100 does not cause the tool 202 to oscillate but moves the tool 202 in the machining direction from the position P1 toward the position P4.

The embodiment is characterized in that, while the tool 202 moves at a constant speed, relative moving motion in the machining direction (in FIG. 2, the direction from the position P1 toward the position P4) is stopped intermittently. Such intermittent stop makes at possible to shred chips having been generated. In this case, while the tool 202 is stopped, the work 200 continues to rotate about the spindle axis. Thus, the chips generated on the surface of the work 200 are to be shredded with the tool 202. In this way, the chips are shredded intermittently by stopping the tool 202 to allow efficient shredding of the chips.

In FIG. 2, the tool width means a width of cutting with the cutting tool 202. In the illustration of FIG. 2, the cutting tool 202 starts from the position P1 and stops moving in the machining direction at the position P2. The cutting tool 202 stopped at the position P2 draws the tool path E extending in a direction at a right angle to the axis (spindle axis) of the work 200 (see FIG. 2). A width of cutting with the cutting tool 202 stopped at the position P2 is indicated by G. Thus, chips existing at an area corresponding to the cutting width G are shredded with the cutting tool 202.

Further, in the illustration of FIG. 2, the cutting tool 202 moves from the position P2, passes through the position P3, and then stops moving in the machining direction at the position P4. The cutting tool 202 stopped at the position P4 also draws the tool path E extending in a direction at a right angle to the axis (spindle axis) of the work 200 (see FIG. 2). A width of cutting with the cutting tool 202 stopped at the position P4 is indicated by H. Thus, chips existing at an area corresponding to the cutting width H are shredded with the cutting tool 202. The cutting width H is similar to the cutting width G.

A stop period, a stop cycle, etc. of the tool 202 will be described in detail next. A period when the tool 202 is stopped (stop period) can be set at an optional period. Meanwhile, this stop period is required to be set at a period allowing chips to be shredded sufficiently. More specifically, if the tool 202 is stopped for a period when the work 200 rotates at least one turn, chips of a volume corresponding to the one turn can be shredded at a position where the tool 202 is stopped. In view of this, in the embodiment, the tool 202 is stopped for a period equal to or longer than a period when the work 200 (the spindle axis of the work 200) rotates one turn. In other words, the stop determination unit 102 outputs a stop instruction while the spindle axis rotates 360 degrees or more.

To realize such a process, a sensor for detecting the rotation angle of the spindle axis of the work 200 is provided at the spindle axis, and the detected rotation angle or number of rotations is supplied to the stop determination unit 102. In response to this, the stop determination unit 102 outputs a stop instruction to the movement command generation unit 104 for a period equal to or longer than a period when the work 200 rotates one turn based on the supplied rotation angle of the spindle axis or the supplied number of rotations of the spindle axis (see FIG. 1). In the case mainly described in the embodiment, the work 200 is attached to the spindle axis. Meanwhile, if the cutting tool 202 is attached to the spindle axis, a process similar to the foregoing process can also be performed in the same way based on the rotation angle or number of rotations of the spindle axis.

The embodiment is characterized in that moving motion of the cutting tool 202 relative to the work 200 is stopped intermittently. A cycle of this stop (repetition cycle) is settable in various ways. First, a cycle of stopping motion (repetition cycle) can be synchronized with the rotation of the work 200. For example, the cutting tool 202 may be started to stop when the work 200 (the spindle axis of the work 200) is at a predetermined rotation angle. As described above, the sensor for detecting the rotation angle of the spindle axis of the work 200 is provided at the spindle axis, and the detected rotation angle or number of rotations is supplied to the stop determination unit 102. When the work 200 (spindle axis) is determined to be at the predetermined angle based on the supplied rotation angle of the spindle axis or the supplied number of rotations of the spindle axis (see FIG. 1), the stop determination unit 102 outputs a stop instruction to the movement command generation unit 104.

As another example, the cutting tool 202 may be started to stop when the work 200 has rotated a predetermined number of rotations. When the work 200 (spindle axis) is determined to have rotated a predetermined number of times based on the number of rotations supplied from the motor 120, the stop determination unit 102 outputs a stop instruction to the movement command generation unit 104. For example, the stop determination unit 102 may be configured to output a stop instruction when the work 200 has rotated one turn or may be configured to output a stop instruction when the work 200 has rotated two turns or more. If two turns are used for the determination, for example, a period corresponding to the two turns becomes a cycle of intermittent stopping motion (repetition cycle).

In another case, the cutting tool 202 can be started to stop by a trigger that may be an external signal (external trigger). In this case, the stop determination unit 102 has received the external trigger (see FIG. 1). If the external trigger instructs stop, the stop determination unit 102 can output a stop instruction to the movement command generation unit 104.

Various signals can be used as the external signal (external trigger). For example, a vision sensor may be used for monitoring the volume of chips. Further, an external mechanism may be provided for asserting the external signal for making a stop on the occurrence of a long chip. Such a vision sensor may be provided inside the machine tool or may be configured separately from the machine tool, for example. Additionally, a comparable mechanism may be used for monitoring the volume of chips, and the vision sensor may be configured to assert the external signal for making a stop if the volume exceeds a constant reference value.

A cycle of intermittent stopping motion can be set in advance as a predetermined time. In this case, the stop determination unit 102 outputs a stop signal at every predetermined time (cycle) to the movement command generation unit 104. To realize such motion, a cycle setting signal (see FIG. 1) can be supplied from outside to the stop determination unit 102. The stop determination unit 102 includes a built-in timer. The stop determination unit 102 may be configured to cause the timer to make clocking motion and configured to output a stop instruction to the movement command generation unit 104 if a timer value has reached a cycle set by the cycle setting signal. The stop determination unit 102 may be configured to include the timer inside the stop determination unit 102 or may be configured to use an external timer.

Figure 3:
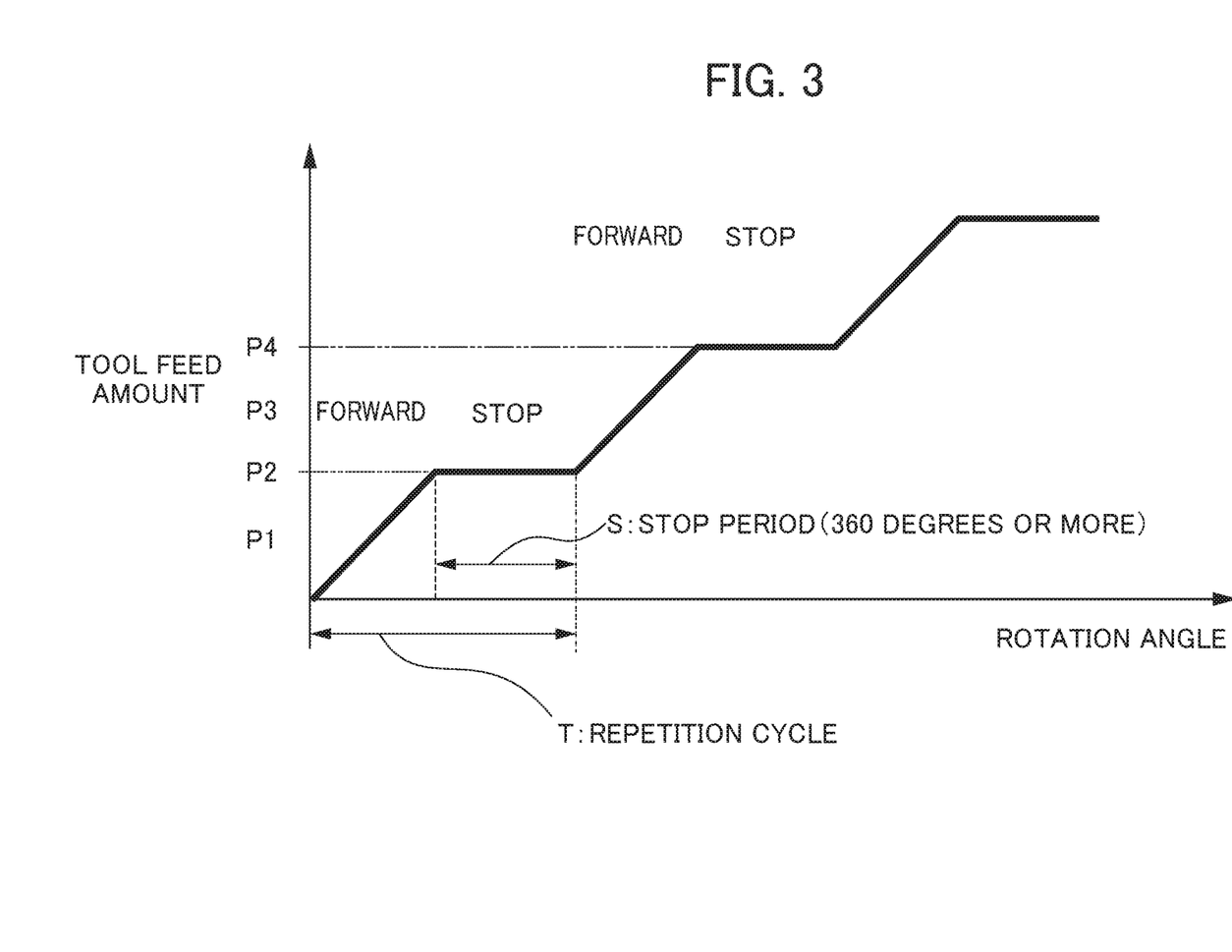
FIG. 3 is a graph showing a specific example of stopping motion made using the controller for the machine tool according to the embodiment of the present invention.

FIG. 3 is a graph showing a specific example of stopping motion made using the controller 100 for the machine tool according to the embodiment. In FIG. 3, a horizontal axis shows the rotation angle of the work 200 (spindle axis), and a vertical axis shows the feed amount (stroke in the machining direction) of the cutting tool 202. At the time of start of machining by cutting, the rotation of the spindle axis of the work 200 is started, and simultaneously, movement of the cutting tool 202 in the machining direction is also started. A period of this movement is shown as "forward move" in the graph of FIG. 3. A period when the cutting tool 202 is stopped without moving is shown as "stop." At the time of start of the machining, the cutting tool 202 moves simultaneously with the rotation of the work 200 so that the graph becomes a straight line with an upward slope.

Next, when the cutting tool 202 has reached the position P2, the stop determination unit 102 outputs a stop command to the movement command generation unit 104 in response to a predetermined factor as a trigger, thereby stopping the movement of the cutting tool 202. As described above, the predetermined factor mentioned herein includes various factors such as if the rotation angle position of the work 200 has reached a predetermined angle, if the amount of rotation of the work 200 has reached a predetermined amount, if an external trigger has been asserted, if a predetermined cycle set in advance has been reached, etc.

After the cutting tool 202 stops at the position P, the cutting tool 202 stops for a predetermined stop period S (see FIG. 3). As described above, this stop period S corresponds to a period when the spindle axis rotates one turn or more. Specifically, the stop period S is a period when the spindle axis rotates 360 degrees or more. In the stop period S, while the cutting tool 202 does not move, the spindle axis continues to rotate. Thus, as shown in FIG. 3, a horizontal graph is drawn in the stop period S.

In the illustration of FIG. 3, time from the start of machining to the end of the stop period is determined as a repetition cycle T of the intermittent stopping motion (see FIG. 3). As described above, the repetition cycle T of the intermittent stopping motion may be synchronized with the rotation of the spindle axis or may be determined by an external trigger. Alternatively, the repetition cycle T may be a predetermined time set in advance. The intermittent stopping motion mentioned herein means intermittent cutting motion, namely, intermittent cutting. Thus, the repetition cycle T of the foregoing intermittent stopping motion also corresponds to the repetition cycle T of the intermittent cutting.

After the stop period S is finished, the stop determination unit 102 stops outputting a stop instruction. This makes the movement command generation unit 104 output a command for move toward the position P3 to the motor 120. As a result, the cutting tool 202 starts to move again in the machining direction and starts moving toward the position P3. Thus, as shown in FIG. 3, the graph again becomes a straight line with an upward slope. As described above, this period is the "forward move" period. Next, a similar intermittent stopping motion is repeated. More specifically, after the cutting tool 202 reaches the position P4, the cutting tool 202 stops for the stop period S again. After expiration of the stop period S, the cutting tool 202 starts to move again. Then, a similar process is repeated.

The foregoing embodiment achieves the following effect. In the embodiment, the cutting tool 202 is caused to make the intermittent stopping motion while making a motion of moving in the machining direction. This makes it possible to efficiently shred chips occurring from cutting. Causing the cutting tool 202 to make the intermittent stopping motion means performing cutting intermittently (intermittent cutting).

In the embodiment, chips can be shredded without performing oscillating cutting, namely, without vibrating a cutting tool, a work, etc. at a low frequency, unlike in the conventional oscillating cutting. More specifically, unlike in the conventional oscillating cutting, chips can be shredded by repeating forward move and stop without exerting control of moving a cutting tool or a work forward or backward. This eliminates the need to accelerate or decelerate a cutting tool finely. As a result, the likelihood of mechanical damage on the cutting tool can be reduced to allow for extension of the life of the cutting tool.

While the embodiment of the present invention has been described in detail above, the foregoing embodiment merely shows specific examples in implementing the present invention. The technical scope of the present invention should not be limited to the foregoing embodiment. Various changes are applicable to the present invention within a range not deviating from the substance of the invention. All those changes are also included within the technical scope of the present invention.

In the example described in the foregoing embodiment, for example, the spindle axis is an axis about which the work 200 rotates. Alternatively, the spindle axis may be configured as an axis about which the cutting tool 202 rotates. In this case, a similar process may also be performed using the rotation of the spindle axis. More specifically, the spindle axis may function not only as a work rotary axis but also as a tool rotary axis.

In the foregoing embodiment, the intermittent cutting of the present invention is realized by moving the cutting tool 202. Alternatively, this intermittent cutting may be realized by moving the work 200. The foregoing embodiment is mainly directed at cutting of an external surface. Alternatively, the present invention is applicable to cutting of an internal surface.

EXPLANATION OF REFERENCE NUMERALS 10, 20 Work
12, 22 Spindle axis
14, 24 Cutting tool
100 Controller
102 Stop determination unit
104 Movement command generation unit
106 Adder
108 Control unit
120 Motor
200 (Rotary) work
202 (Cutting) tool
A Oscillation
B Machining direction
C, D Path
E Tool path
F Tool path
G Width of cutting of tool 202 determined when tool 202 stops at P2
H Width of cutting of tool 202 determined when tool 202 stops at P4
J Move direction of tool viewed from work 200
M Move in the air
P1, P2, P3, P4 Position
S Stop period
T Repetition cycle

What is claimed is:

1. A controller for a machine tool used for machining by cutting of a work as a cutting target by means of coordinated motion of multiple axes including at least a spindle axis, comprising:
a movement command generation unit that outputs a movement command for cutting the work by moving a cutting tool and the work relative to each other in a machining direction such that an entirety of the cutting tool is spaced from the spindle axis in a direction perpendicular to the spindle axis;
a stop determination unit that outputs a stop instruction for intermittently stopping the relative movement in the machining direction to the movement command generation unit; and
a sensor that detects a rotation angle of the spindle axis, wherein
the movement command generation unit outputs a movement command for stopping the relative movement between the cutting tool and the work in the machining direction based on the stop instruction, and the stop determination unit outputs the stop instruction for a period when the spindle axis rotates 360 degrees or more, based on the rotation angle detected by the sensor.

2. The controller for the machine tool according to claim 1, wherein the stop determination unit outputs the stop instruction in synchronization with the rotation angle of the spindle axis.

3. The controller for the machine tool according to claim 1, wherein the stop determination unit outputs the stop instruction at every predetermined temporal cycle.

4. The controller for the machine tool according to claim 1, wherein the stop determination unit outputs the stop instruction in response to an external signal as a trigger.

5. The controller for the machine tool according to claim 2, wherein the stop determination unit outputs the stop instruction in response to an external signal as a trigger.

6. The controller for the machine tool according to claim 3, wherein the stop determination unit outputs the stop instruction in response to an external signal as a trigger.

7. The controller for the machine tool according to claim 1, wherein the stop determination unit initiates outputting the stop instruction in response to an external signal as a trigger.

8. The controller for the machine tool according to claim 1, wherein the stop determination unit initiates outputting the stop instruction in response to an external signal from a vision sensor as a trigger when the vision sensor detects that a volume of chips exceeds a reference value.

9. The controller for the machine tool according to claim 1, wherein the stop determination unit initiates outputting the stop instruction when the spindle axis has rotated a predetermined number of times.

* * * * *